(12) United States Patent
Brandner et al.

(10) Patent No.: US 9,029,044 B2
(45) Date of Patent: May 12, 2015

(54) INTERCONNECTOR FOR A HIGH-TEMPERATURE SOLID ELECTROLYTE FUEL CELL, METHOD OF PRODUCING A FUEL CELL, AND HIGH-TEMPERATURE SOLID ELECTROLYTE FUEL CELL

(75) Inventors: Marco Brandner, Oy-Mittelberg (DE); Wolfgang Kraussler, Weissenbach (AT); Gerhard Leichtfried, Reutte (AT); Andreas Venskutonis, Reutte (AT)

(73) Assignee: Plansee SE, Reutte (AT)

( * ) Notice: Subject to any disclaimer, the term of this patent is extended or adjusted under 35 U.S.C. 154(b) by 442 days.

(21) Appl. No.: 12/721,804

(22) Filed: Mar. 11, 2010

(65) Prior Publication Data

US 2010/0233576 A1    Sep. 16, 2010

(30) Foreign Application Priority Data

Mar. 12, 2009   (AT) ................ GM146/2009

(51) Int. Cl.
| | | |
|---|---|---|
| *H01M 8/10* | (2006.01) | |
| *H01M 8/02* | (2006.01) | |
| *C22C 32/00* | (2006.01) | |
| *H01M 8/12* | (2006.01) | |

(52) U.S. Cl.
CPC .......... *H01M 8/0232* (2013.01); *B22F 2998/00* (2013.01); *B22F 2999/00* (2013.01); *C22C 32/00* (2013.01); *H01M 8/0245* (2013.01); *H01M 2008/1293* (2013.01); *Y02E 60/50* (2013.01); *Y02E 60/525* (2013.01)

(58) Field of Classification Search
CPC .................................................. H01M 8/0232
USPC ........... 75/245–247, 230–235; 429/417–522, 429/129, 247–249, 535; 419/10
See application file for complete search history.

(56) References Cited

U.S. PATENT DOCUMENTS

| | | | |
|---|---|---|---|
| 3,516,865 | A | 6/1970 | Tedmon et al. |
| 5,302,181 | A * | 4/1994 | Morichika et al. .............. 75/245 |
| 5,407,758 | A | 4/1995 | Greiner et al. |
| 5,427,601 | A * | 6/1995 | Harada et al. ................... 75/235 |

(Continued)

FOREIGN PATENT DOCUMENTS

| | | |
|---|---|---|
| DE | 19705874 A1 | 8/1998 |
| EP | 0423448 A1 | 4/1991 |

(Continued)

OTHER PUBLICATIONS

European Search Report date Jun. 23, 2010.

*Primary Examiner* — Milton I Cano
*Assistant Examiner* — Jimmy K Vo
(74) *Attorney, Agent, or Firm* — Laurence A. Greenberg; Werner H. Stemer; Ralph E. Locher

(57) ABSTRACT

An interconnector, or bipolar plate, for a high-temperature solid electrolyte fuel cell is composed of a sintered chromium alloy which has sintering pores and contains >90% by weight of Cr, from 3 to 8% by weight of Fe and optionally from 0.001 to 2% by weight of at least one element of the group of rare earth metals. The chromium alloy contains from 0.1 to 2% by weight of Al and the sintering pores are at least partially filled with an oxidic compound containing Al and Cr. The interconnector has a high impermeability to gas and dimensional stability.

20 Claims, 3 Drawing Sheets

(56) References Cited

U.S. PATENT DOCUMENTS

| | | | |
|---|---|---|---|
| 5,608,174 | A | 3/1997 | Eck et al. |
| 5,733,682 | A | 3/1998 | Quadakkers et al. |
| 6,268,076 | B1 * | 7/2001 | Diekmann et al. ............ 429/495 |
| 6,280,868 | B1 | 8/2001 | Badwal et al. |
| 7,390,456 | B2 | 6/2008 | Glatz et al. |
| 7,951,510 | B2 * | 5/2011 | Ji et al. ............ 429/522 |
| 8,652,691 | B1 | 2/2014 | Perry et al. |
| 2003/0021715 | A1 | 1/2003 | Glatz et al. |
| 2004/0043269 | A1 | 3/2004 | Taniguchi et al. |
| 2006/0192323 | A1 | 8/2006 | Zobl et al. |
| 2008/0096079 | A1 * | 4/2008 | Linderoth et al. ............ 429/33 |
| 2009/0186249 | A1 * | 7/2009 | Narendar ............ 429/33 |

FOREIGN PATENT DOCUMENTS

| | | |
|---|---|---|
| EP | 0510495 A1 | 10/1992 |
| EP | 0570072 A2 | 11/1993 |
| EP | 0578855 A1 | 1/1994 |
| EP | 1318560 A2 | 6/2003 |
| EP | 1376727 A2 | 1/2004 |
| JP | 02258946 A | 10/1990 |
| JP | 04325651 A | 11/1992 |
| JP | 06188004 A | 7/1994 |
| JP | 08188844 A | 7/1996 |
| JP | 9063605 A | 3/1997 |
| JP | 1017958 A | 1/1998 |
| JP | 2003027205 A | 1/2003 |
| JP | 2004517215 A | 6/2004 |
| JP | 2008527660 A | 7/2008 |
| WO | 9526576 A1 | 10/1995 |
| WO | 9735349 A1 | 9/1997 |
| WO | 02055747 A1 | 7/2002 |
| WO | 2004012885 A2 | 2/2004 |

* cited by examiner

INTERCONNECTOR FOR A HIGH-TEMPERATURE SOLID ELECTROLYTE FUEL CELL, METHOD OF PRODUCING A FUEL CELL, AND HIGH-TEMPERATURE SOLID ELECTROLYTE FUEL CELL

CROSS-REFERENCE TO RELATED APPLICATION

This application claims the priority, under 35 U.S.C. §119, of Austrian application GM 146/2009, filed Mar. 12, 2009; the prior application is herewith incorporated by reference in its entirety.

BACKGROUND OF THE INVENTION

Field of the Invention

The invention lies in the field of high-temperature fuel cells. More specifically, the invention pertains to an interconnector for a high-temperature solid electrolyte fuel cell. The interconnector is composed of a sintered chromium alloy which has sintering pores and contains >90% by weight of Cr, from 3 to 8% by weight of Fe, and optionally from 0.001 to 2% by weight of at least one element of the group of rare earth metals. The invention further relates to a process for producing an interconnector and also a high-temperature solid electrolyte fuel cell containing an interconnector.

The metallic interconnector (also known as bipolar plate or current collector) is an essential component of a high-temperature solid electrolyte fuel cell (also known as solid oxide fuel cell (SOFC) or high-temperature fuel cell).

A high-temperature solid electrolyte fuel cell is usually operated at an operating temperature of between 650° C. and 1000° C. The electrolyte consists of a solid ceramic material which is able to conduct oxygen ions but acts as an insulator for electrons. K. Wincewicz, J. Cooper, "Taxonomies of SOFC material and manufacturing alternatives", Journal of Power Sources (2005) describes zirconium oxide doped with yttrium, scandium or calcium (YSZ, SSZ or CSZ), doped lanthanum oxide and doped cerium oxide as electrolyte materials. For cathode and anode, use is made of ceramics which conduct ions and electrons, for example strontium-doped lanthanum manganate (LSM) for the cathode and a nickel-YSZ (or SSZ, CSZ) cermet for the anode.

The interconnector is arranged between the individual cells, with cells, optional contact layers which are present and interconnectors being stacked to form a stack. The interconnector connects the individual cells in series and thus collects the electricity generated in the cells. In addition, it supports the cell mechanically and serves to separate and convey the reaction gases on the anode and cathode sides. The interconnector is exposed to both oxidizing and reducing media at high temperatures. This requires a correspondingly high corrosion resistance.

In addition, the coefficient of thermal expansion of the interconnector from room temperature up to the maximum operating temperature has to be well matched to the coefficients of thermal expansion of the electrolyte material, anode material and cathode material. Further requirements are impermeability to gas, a high, constant electron conductivity and also a very high thermal conductivity at the operating temperature.

In general, alloys which form aluminum oxide and chromium oxide, sometimes with proportions of silicon, are predominantly used in a wide variety of high-temperature applications because of their good high-temperature corrosion properties. Owing to the low electronic conductivity of $Al_2O_3$ and $SiO_2$, alloys which form chromium oxide are preferably proposed for interconnectors in high-temperature solid electrolyte fuel cells. A very well matched thermal expansion behavior combined with a high corrosion resistance is displayed by chromium-iron alloys. The corrosion resistance can be improved further by addition of yttrium. A chromium alloy containing from 5 to 50% by weight of Fe and an oxide of a rare earth metal from the group consisting of Y, La, Ce, Nd having a particle size of from 1 to 10 μm is disclosed in Japanese patent application JP 02-258946 A.

U.S. Pat. No. 5,302,181 and its European counterpart EP 0 510 495 A1 describe, inter alia, an oxide dispersion-reinforced, heat-resistant, sintered material which contains from 0.2 to 2% by weight of $Y_2O_3$ in finely divided form having a particle size of not more than 0.1 μm, where the matrix material can, inter alia, also consist of a chromium base material containing from 0 to 20% by weight of Fe and from 0 to 10% by weight of an element from the group consisting of Al, Mo, W, Nb, Ta, Hf and Al—Ti. Fe is added to increase the sinterability. Al is present in precipitated intermetallic form in the matrix to increase the strength. The material is produced by mechanical alloying; as densification process, mention is made only of pressure-aided sintering processes, namely hot pressing, hot isostatic pressing and hot powder extrusion.

Commonly assigned European patent publication EP 0 570 072 describes a chromium alloy containing from 0.005 to 5% by weight of at least one oxide of the group of rare earth metals, from 0.1 to 32% by weight of at least one metal from the group consisting of Fe, Ni and Co, up to 30% by weight of at least one metal from the group consisting of Al, Ti, Zr, Hf, up to 10% by weight of at least one metal from the group consisting of V, Nb, Mo, Ta, W, Re, up to 1% by weight of at least one element from the group consisting of C, N, B and Si. The alloy is produced by powder mixing, pressing, sintering, encasing the sintered plate in steel sheet and hot rolling the encased plate.

The use of a Cr—Fe alloy for fuel cells was disclosed for the first time in U.S. Pat. No. 3,516,865. The Cr content is from 15 to 85% by weight. The alloy can optionally contain Y, Hf, Zr or Th. U.S. Pat. No. 5,407,758 and its European counterpart EP 0 578 855 describe a metallic component composed of a chromium alloy containing from 3 to 10 atom % of Fe and from 0.5 to 5 atom % of rare earth metal and/or rare earth metal oxide for high-temperature solid electrolyte fuel cells provided with a ceramic solid electrolyte composed of YSZ.

U.S. Pat. No. 5,733,682 and WO 95/026576 A1 describe a bipolar plate composed of an alloy which forms chromium oxide, for example $Cr-5Fe-1Y_2O_3$, having an Al-enriched surface layer in the region of the gas channels. The Al-enriched zone is produced by alitizing to form the intermetallic phases $Cr_5Al_8$ or $Cr_4Al_9$. The Al-enriched zone is removed again in the region of the electric contact surfaces by means of a complicated grinding process in order to prevent a reduction in the conductivity due to formation of $Al_2O_3$. During use, $Al_2O_3$ is formed on the walls of the gas channels.

Since the interconnector has a complex surface geometry in order to produce a defined flow path, powder-metallurgical processes which produce the final shape without subsequent machining are advantageous.

Thus, commonly assigned U.S. Pat. No. 7,390,456 and WO 02/055747 A1 describe a powder-metallurgical process for producing high-density shaped bodies composed of an alloy containing at least 20% by weight of Cr, Fe and one or more additional metallic and/or ceramic alloying components, in which the interconnector is pressed and sintered to close to its final shape using a powder mix containing elemental chromium powder and a prealloy powder composed of iron and the additional alloying components. Interconnectors produced in this way can be joined by soldering without further machining to give ready-to-use interconnectors. Such inexpensive manufacture is generally an important basic prerequisite for wide introduction of chromium alloys as interconnectors in high-temperature solid electrolyte fuel cells. High manufacturing costs result from the use of very pure chromium powder (2N5). Particular attention is paid to elements which reduce the conductivity of the chromium oxide layer. The high purity requires the use of high-grade ores and special purification processes. Since a reduction in the system costs is necessary for industrial use of the high-temperature solid electrolyte fuel cell and the interconnector makes up an appreciable part of the total costs, the use of cheaper powders would be advantageous.

Commonly assigned patent application publication US 2006/192323 A1 and its counterpart WO 2004/012885 A2 describe a process for producing a shaped part, for example an interconnector, consisting of a disc- or plate-shaped base body having a multiplicity of knob- and or ridge-like raised regions which go over into the base body via inclined side faces by pressing and sintering pulverulent starting materials to close to final shape, with shaping being carried out in a two-stage pressing process. A powder-metallurgical process which leads to components having the final shape is only possible in the case of low to moderate sintering shrinkage since a high sintering shrinkage cannot be set to a sufficiently constant value because of fluctuations in the physical powder properties. In addition, residual porosity after the sintering process is advantageous for the second pressing step which results in the final shape.

Components produced as described in US 2006/192323 A1 and WO 2004/012885 A2 therefore have residual porosity. Filling sintering pores with formation of an oxide of the matrix material is known. This process is referred to as bronzing in the case of products made of sintered steel. Here, the sintered component is treated in steam at elevated temperature in such a way that the sintering pores are filled with $Fe_2O_3$. Filling of the sintering pores with a corresponding oxide can also be employed in the case of chromium alloys. However, it is a disadvantage that the filling of the sintering pores proceeds from the outside inwards, as a result of which the oxygen permeability into the interior of the interconnector and thus uniform filling of pores near the center is hindered as the process time increases. In addition, an interconnector typically has a knob and/or ridge structure on the surface, which results in different local wall thicknesses. This, too, makes an inexpensive and reliable process difficult.

SUMMARY OF THE INVENTION

It is accordingly an object of the invention to provide a bipolar plate, which overcome the above-mentioned disadvantages of the heretofore-known devices and methods of this general type and which provides for an interconnector that has a coefficient of thermal expansion matched to the ceramic components, a high dimensional stability, a high corrosion resistance both in reducing and oxidizing media, a high electrical conductivity in the region of the contact surfaces to the anode and cathode and also a high impermeability to gas and, further, that can be produced at low cost. It is a further object to provide a process for producing such an interconnector. Yet another object of the invention is to provide a high-temperature solid electrolyte fuel cell which comprises a ceramic solid electrolyte comprising stabilized zirconium oxide and an interconnector having the above-mentioned property profile.

With the foregoing and other objects in view there is provided, in accordance with the invention, an interconnector for a high-temperature solid electrolyte fuel cell, comprising:

a sintered chromium alloy formed with sintering pores and containing a proportion of >90% by weight of Cr, from 3 to 8% by weight of Fe, and optionally from 0.001 to 2% by weight of at least one element selected from the group consisting of rare earth metals;

the chromium alloy further containing from 0.1 to 2% by weight of Al, with said sintering pores being at least partly filled with an oxidic compound containing Al and Cr.

With the above and other objects in view there is also provided, in accordance with the invention, a high-temperature solid electrolyte fuel cell, which comprises a ceramic solid electrolyte formed of stabilized zirconium oxide; and an interconnector as summarized above.

With the above and other objects in view there is also provided, in accordance with the invention, a method of producing such an interconnector. The novel method comprises the following method steps:

producing a powder mix from one or more of a mixed powder, a partly pre-alloyed powder, and a fully pre-alloyed powder;

shaping by die pressing at a pressing pressure p set to 500<p<1000 MPa;

optionally presintering at a temperature T set to 700° C.<T<1200° C. in a reducing atmosphere and optionally calibration pressing at a pressing pressure p set to 500<p<1000 MPa;

sintering at a temperature T set to 1200° C.<T<solidus temperature in a reducing atmosphere;

carrying out oxidative treatment, preferably at a temperature T between 700° C. and 1200° C.

In accordance with an optional treatment step, the component may be subjected to sandblasting.

The interconnector, or bipolar plate, or current collector, is composed of a sintered chromium alloy containing >90% by weight of chromium, from 3 to 8% by weight of Fe and optionally from 0.001 to 2% by weight of at least one element from the group of the rare earth metals. The chromium alloy contains from 0.1 to 2% by weight of Al, with preference being given to more than 80%, preferably more than 90% and particularly preferably more than 99%, of the Al being present in the form of an oxidic compound which also contains Cr. The rest of the Al, if present, is present in dissolved form, in the form of a nonoxidic compound or in the form of an intermetallic phase. The content of dissolved Al is less than 500 µg/g, preferably less than 200 µg/g, more preferably less than 100 µg/g and particularly preferably less than 50 µg/g.

In determining the Al content, the total Al content of the interconnector is taken into account regardless of the form in which it is bound. If the Al content of the chromium alloy is less than 0.1% by weight, insufficient Al is incorporated into the oxidic compound containing Al and Cr. If the Al content is above 2% by weight, oxidic precipitates containing Al are formed to an increased extent at the grain boundaries and in the interior of the grains. The preferred aluminum content of the chromium alloy is from 0.15 to 0.5% by weight.

The sintered chromium alloy is formed with sintering pores, preferably from 2 to 20% by volume, more preferably from 4 to 15% by volume. The sintering pores are at least partly filled with the oxidic compound containing Al and Cr. A lower porosity can be achieved only by way of a high sintering shrinkage. A high sintering shrinkage makes it more difficult to set tight dimensional tolerances. If tight dimensional tolerances cannot be achieved, costly subsequent machining is necessary. An interconnector having a residual porosity of greater than 20% by volume does not have sufficient strength and stability of the component. In addition, it is not possible to achieve a sufficiently high impermeability to gas by filling of the sintering pores with the oxidic component containing Al and Cr.

The filling of the sintering pores with the oxidic compound containing Al and Cr is effected by an oxidative treatment of the sintered component. The oxidative treatment can be carried out as a separate process step or can be integrated into the sintering process. Filling of the sintering pores occurs uniformly and thus in a simple and reliable way in terms of the process. Here, aluminum- and chromium-containing oxides are formed mainly in the region of the sintering pores and only to a small extent at the grain boundaries and in the interior of the grains. The oxide layer formed on the outer surface of the interconnector preferably contains at least 90% by weight of chromium oxide. The outer oxide layer particularly preferably contains at least 95% by weight of chromium oxide. The Al content of the outer oxide layer is preferably below the detection limit of conventional analytical methods (from 0.1 to 1% by weight). The chromium oxide is preferably present as $Cr_2O_3$. An oxide layer which has a very good conductivity is thus formed on the surface. This applies both to an oxide layer which is formed by the oxidative treatment in the production process and also that formed in long-term use. It is thus not necessary in principle to remove the oxide layer formed by the oxidative treatment in the production process. If a clean metallic surface is desired, the oxide layer can be removed by, for example, a blasting process.

The proportion of the oxidic compound containing Al and Cr in the sintering pores is (based on the total content of the oxidic compound containing Al and Cr) preferably greater than 65% by volume, that at the grain boundaries is preferably less than 20% by volume and that in the interior of the grains is preferably less than 15% by volume. Particular preference is given to the proportion of the oxidic compound containing Al and Cr in the sintering pores being (based on the total content of the oxidic compound containing Al and Cr) greater than 85% by volume, that at the grain boundaries being less than 10% by volume and that in the interior of the grains being less than 5% by volume.

The oxidic compound containing Al and Cr advantageously has an average Al/Cr ratio (contents in each case in atom %) of greater than 1. A preferred average Al/Cr ratio is greater than 2 and a particularly preferably Al/Cr ratio is greater than 5. As shown in the example, an Al/Cr ratio of up to 8.6 was able to be measured.

The oxidative treatment of the component is advantageously carried out at a temperature T such that 700° C.<T<1200° C. Below 700° C., the reaction rate is low. Above 1200° C., hexavalent chromium oxide is formed to an appreciable extent.

The formation of the oxidic compound containing Al and Cr ensures uniform filling of the pores over the cross section of the interconnector.

This avoids further internal oxidation and expansion of the interconnector during operation of the high-temperature solid electrolyte fuel cell. It is thus ensured that no damage, for example, fracture, of the ceramic cell components in the stack occurs during operation of the high-temperature solid electrolyte fuel cell.

The oxidic compound containing Al and Cr preferably consists of Al, Cr and O, the balance typical impurities. It is advantageous for the oxidic compound containing Al and Cr to be present as mixed oxide. In this context, a mixed oxide is not only an oxide in which the individual components are completely dissolved in one another but also an oxide in which the individual components can no longer be resolved separately by means of high-resolution analytical methods, for example analytical TEM. A preferred oxidic compound is an $xAl_2O_3.yCr_2O_3$. The preferred stoichiometric factors x and y can be derived from the above-mentioned Al/Cr values. To ensure sufficient impermeability to gas and dimensional stability of the interconnector during the entire operating time of the high-temperature solid electrolyte fuel cell, it is advantageous for at least 50% of the total internal pore volume of the chromium alloy to be filled with the oxidic compound containing Al and Cr. The 50% by volume is an average value. It is possible for individual pores to be filled to a lower volume content of oxidic compound without the function of the component being impaired thereby. Pores having a relatively low degree of fill are, in particular, those which have no open connection to the surface. However, these pores remain stable even in long-term use and are therefore not critical either to the impermeability to gas or to the dimensional stability. The total sintering pore volume filled with the oxidic compound containing Al and Cr is preferably greater than 75%, particularly preferably greater than 90%.

Preference is given to more than 80%, more preferably more than 90% and particularly preferably more than 99%, of the aluminum present in the chromium alloy being converted into the oxidic compound by the oxidative treatment. Here, the form in which the Al is present in the powder mix is immaterial. For example, it is possible to process chromium powders in which Al is present as $Al_2O_3$, as metallic Al, or as metallic Al and $Al_2O_3$.

As far as the corrosion behavior of the chromium alloy is concerned, it is advantageous for this alloy to contain from 0.001 to 2% by weight of at least one element from the group of rare earth metals. The rare earth metals can be present in dissolved or bound form, preferably in oxidic form. The best results can be achieved when the alloy contains from 0.005 to 0.5% by weight of yttrium. Yttrium can be present in dissolved metallic form and/or in the form of yttrium oxide and/or in the form of yttrium mixed oxide. As preferred yttrium mixed oxides, mention may be made of those based on Al—Y and/or Al—Cr—Y. The addition of yttrium is also advantageous for adherence to tight dimensional tolerances since yttrium reduces the sinterability of the chromium alloy. This is of importance since it is then possible to sinter at high temperatures without appreciable sintering shrinkage occurring. A high sintering shrinkage would be advantageous in terms of the impermeability to gas and the corrosion resistance of the interconnector, but would have an adverse effect on the ability to produce components having a shape close to the final shape. Excellent homogenization of the chromium alloy can be achieved by the high sintering temperature. It can be assumed that both the grain boundary diffusion rate and the generation of vacancies by transverse sliding of displacements can be reduced by Y-containing precipitates.

Furthermore, the chromium alloy can contain up to 3% by weight of further components which are insoluble in the chromium alloy and up to 1% by weight of further components which are soluble in the chromium alloy without the use properties being unacceptably impaired. The content of further insoluble components is preferably <1% by weight and the content of further soluble components is preferably <0.1% by weight. An example of an insoluble component is Si.

The chromium alloy therefore preferably has the following composition:
>90% by weight of Cr;
from 3 to 8% by weight of Fe;
from 0.1 to 2% by weight of Al;
optionally from 0.001 to 2% by weight of at least one element from the group of rare earth metals;
optionally up to 3% by weight of at least one further component which is insoluble in the chromium alloy;
optionally up to 1% by weight of at least one further component which is soluble in the chromium alloy;
balance oxygen and impurities.

An even more preferable chromium alloy has the following composition:
>90% by weight of Cr;
from 3 to 8% by weight of Fe;
from 0.1 to 2% by weight of Al;
optionally from 0.001 to 2% by weight of at least one element from the group of rare earth metals;
optionally up to 1% by weight of at least one further component which is insoluble in the chromium alloy;
optionally up to 0.1% by weight of at least one further component which is soluble in the chromium alloy;
balance oxygen and impurities.

In a particularly preferred embodiment, the chromium alloy has the following composition:
>90% by weight of Cr;
from 3 to 8% by weight of Fe;
from 0.1 to 2% by weight of Al;
from 0.005 to 0.5% by weight of Y;
remainder oxygen and impurities.

The interconnector of the invention can advantageously be used in a high-temperature solid electrolyte fuel cell having a solid electrolyte composed of stabilized zirconium oxide. The zirconium oxide can be stabilized with yttrium, calcium or scandium in a manner known from the prior art. For a cathode, it is possible to use conventional ceramic cathode materials, for example strontium-doped lanthanum manganate. In the case of the anode, too, recourse can be made to proven materials, for example cermet materials consisting of nickel and stabilized zirconium oxide.

In the production of the interconnectors, it is possible to make recourse to, inter alia, the powder-metallurgical processes or individual process steps as described in the above-mentioned commonly assigned U.S. Pat. No. 7,390,456 (WO 02/055747 A1) and/or US 2006/192323 A1 (WO 2004/012885 A2). These publications, as well as the other publications mentioned above, are herewith incorporated by reference.

Suitable chromium (Cr) powders are, in particular, powders having a particle size of <200 μm, preferably <160 μm, measured by laser light scattering.

The Cr powder preferably contains Al in metallic form and bound as $Al_2O_3$. The Al content (sum of metallic and bound Al) is preferably from 2000 to 10 000 μg/g, and the Si content is <700 μg/g. Preference is also given to using an elemental Fe powder or an Fe—Y prealloy powder. The Fe—Y prealloy powder is preferably produced by an atomization process. However, it is also possible to use Cr—Fe or Cr—Fe—Y prealloy powder. The individual powder constituents are mixed in mechanical or diffusion mixers with addition of a conventional pressing aid. The mixed powder mix is introduced into a pressing die and densified and shaped at a pressing pressure p such that 500<p<1000 MPa. After pressing, a sintering step is carried out in a reducing atmosphere at a temperature T such that 1200° C.<T<solidus temperature.

Here, the removal of binder from the green body is carried out as an integral part of the sintering step or as a separate process step.

As an alternative, the green body after pressing can be presintered in a reducing atmosphere, preferably at a temperature T such that 700° C.<T<1200° C. Here, the removal of binder from the green body is carried out as an integral part of the presintering step or as a separate process step. The presintered part is subjected to after-pressing at a pressing pressure p such that 500<p<1000 MPa. The after-pressing is carried out as calibration pressing and produces the final shape of the interconnector. Since the strength of the chromium alloy is reduced by the presintering process, further densification can be achieved by the after-pressing procedure. After after-pressing, a sintering step is carried out in a reducing atmosphere at a temperature T such that 1200° C.<T<solidus temperature. Preference is given to carrying out this two-stage pressing procedure according to the process disclosed in the above-mentioned WO 2004/012885.

In a next step, the component is subjected to an oxidative treatment, preferably at a temperature T such that 700° C.<T<1200° C. The oxidative treatment can be carried out, for example, in air or oxygen. The treatment time is preferably selected so that, in a gravimetric study, >85% of the increase in weight at the respective temperature is achieved in an oxidation time of 24 hours. In a further process step, the oxidized component can be subjected to a sandblasting process to remove the oxides that are present on the surface.

The preferred production method can thus be summarized as follows:
production of a powder mix using mixed, partly prealloyed and/or fully prealloyed powder;
shaping by die pressing at a pressing pressure p set to 500<p<1000 MPa;
optionally presintering at a temperature T such that 700° C.<T<1200° C. in a reducing atmosphere and optionally calibration pressing at a pressing pressure p set to 500<p<1000 MPa;
sintering at a temperature T such that 1200° C.<T<solidus temperature in a reducing atmosphere;
oxidative treatment preferably at a temperature T set to 700° C.<T<1200° C.;
optionally sandblasting.

The shaping of the interconnector can also be carried out by other suitable processes, for example metal powder injection molding. Powder casting and powder extrusion followed by a stamping step are also suitable production processes.

Other features which are considered as characteristic for the invention are set forth in the appended claims.

Although the invention is illustrated and described herein as embodied in an interconnector for a high-temperature solid electrolyte fuel cell, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of a specific exemplary production process when read in connection with the accompanying drawings.

DETAILED DESCRIPTION OF THE INVENTION

A disc-shaped interconnector having a diameter of 120 mm, a total thickness of 2.5 mm and a diameter of the central hole of 8.8 mm and having ridge-like raised regions having a height of about 0.5 mm and a width of 5 mm on one side of the base body and ridge-like raised regions having a height of about 0.7 mm and a width of 5 mm arranged on the opposite side and knob-like raised regions arranged in between at regular intervals and in rows was produced with the final shape. For this purpose, a powder mix consisting of 95% by weight of chromium powder having an Al content of 0.181% by weight and 5% by weight of a prealloy powder composed of iron containing 0.05% by weight of yttrium with addition of 1% by weight of microwax as pressing aid was firstly made up. The powders used had particle sizes in the range from 36 to 160 μm. The powder mix was densified and shaped by die pressing at 800 MPa. The green body was then presintered in hydrogen at 1000° C. for 3 hours. Calibration pressing of the presintered component was carried out in a second pressing tool. Here, the die was dimensioned so that the interconnector had the final shape after the second pressing step.

The pressing tools were configured as described in US 2006/192323 A1 and WO 2004/012885 A2.

The component was then sintered in hydrogen at 1450° C. for 2 hours, and it was subsequently subjected to a preoxidation carried out at a temperature of 950° C. in air for 18 hours.

The interconnector produced in this way had an average density of 6.61 g/cm³ (average of 15 specimens). Specimens from the center (based on the cross section of the interconnector) close to the edge and specimens from the surface were prepared by means of focussed ion beam (FIB) for examination on an analytical TEM (Philips CM-20). The analysis was carried out by means of energy dispersive X-ray analysis (EDX). The morphological examination was carried out on a scanning electron microscope, giving the result that the pores are uniformly filled with oxide.

Figure 1:
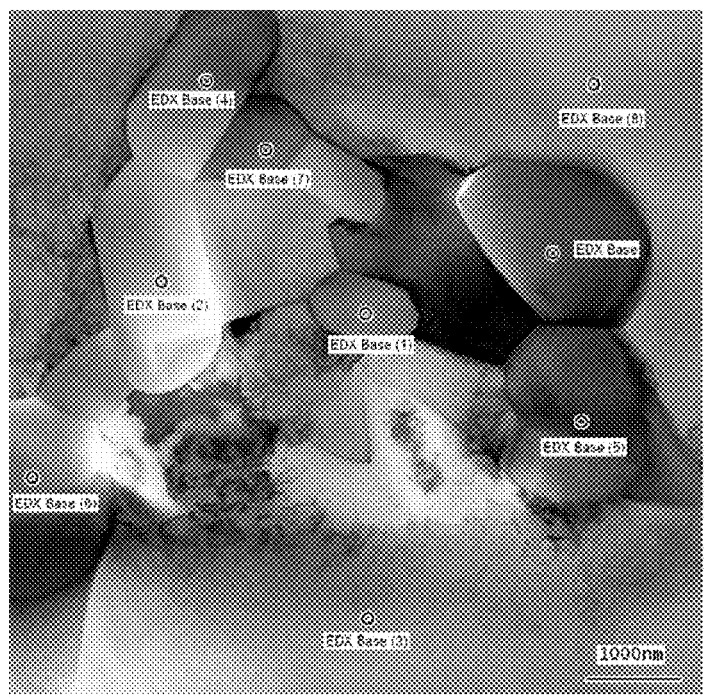
FIG. 1 sintered, oxidized interconnector as per the production example, specimen from the center, TEM bright field image, sintering pore filled with Al- and Cr-containing oxide, labeled EDX analysis points.
Figure 2:
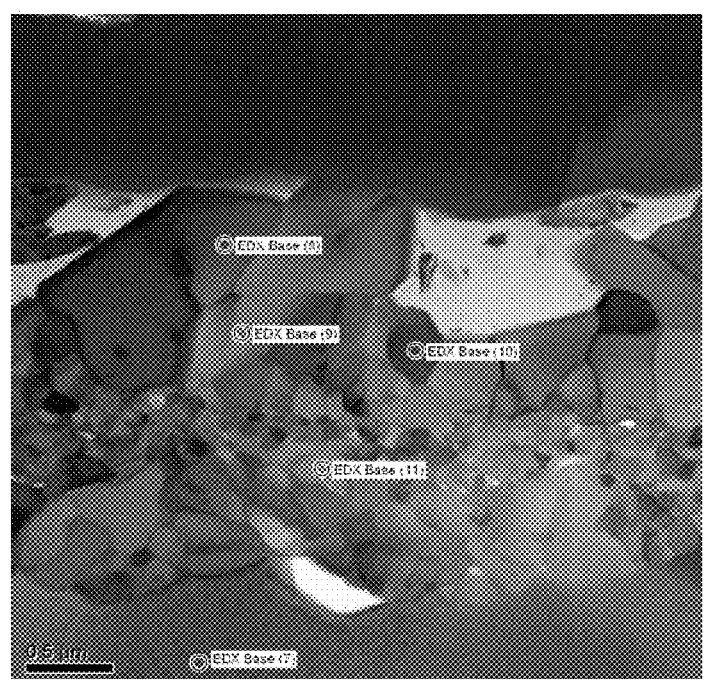
FIG. 2 sintered, oxidized interconnector as per the production example, specimen from the surface, TEM bright field image, outer oxide layer, labeled EDX analysis points.
Figure 3:
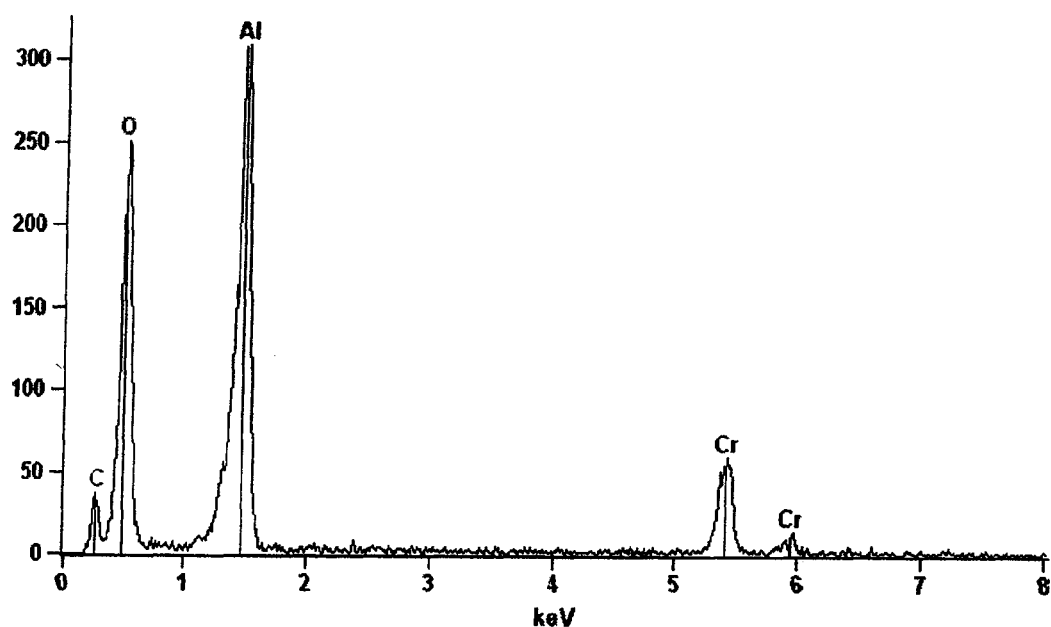
FIG. 3 EDX spectrum for analysis point "Base (1)" as per FIG. 1 (Al- and Cr-containing oxide in sintering pore).
Figure 4:
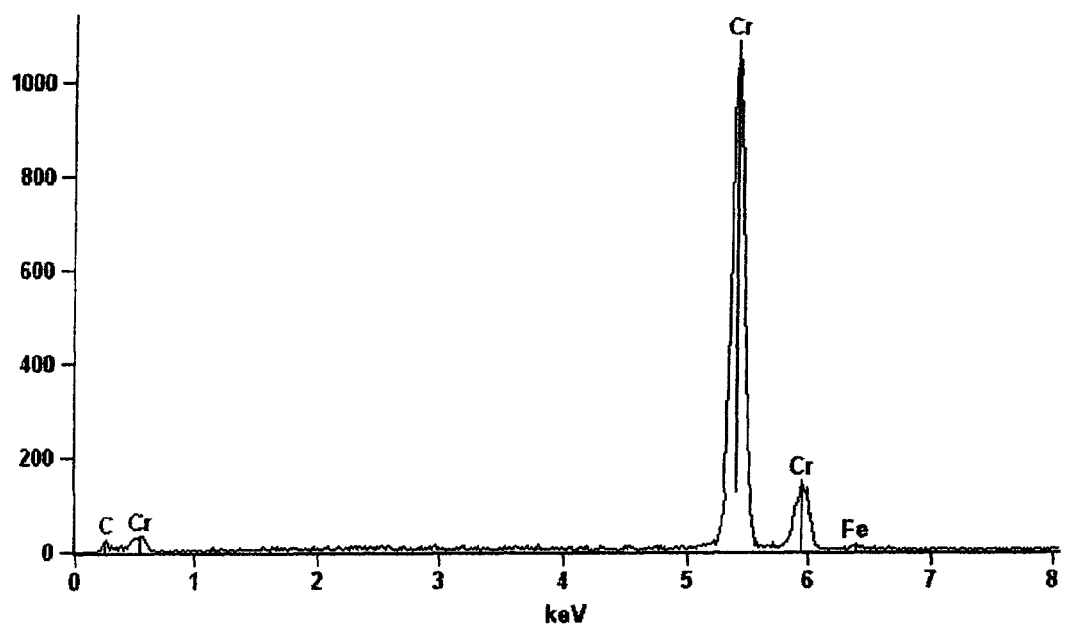
FIG. 4 EDX spectrum for matrix material, specimen from the center.

The results of the transmission electron microscopic examination and EDX analyses are summarized below. FIG. 1 shows a sintering pore filled with oxide. Individual oxide particles which are joined to one another are present. FIG. 2 shows the oxide layer in the region of the surface zone. The oxide layer thickness is about 6 μm. FIG. 3 shows the EDX spectrum of an oxide particle which has been formed in the sintering pore. The oxide is made up of Al, Cr and O. The C peak is a measurement artefact. The elemental mapping does not resolve Al and Cr separately. According to the definition given in the description, this is therefore an Al—Cr mixed oxide. The calculated Al/Cr (atom %/atom %) ratio is 6.9. The further examination of oxide particles in sintering pores in each case revealed an Al-rich Al—Cr mixed oxide, with the lowest Al/Cr (atom %/atom %) value being 4.7 and the highest Al/Cr (atom %/atom %) value being 8.6. Scattered oxides could also be detected at the grain boundaries and the interior of the grains, with these likewise comprising Al and Cr as a high Al/Cr ratio. FIG. 4 shows the EDX spectrum for a measurement point in the region of the matrix material.

The Al content of the matrix material is below the detection limit as a result of the oxidative treatment. The matrix material contains only Cr and Fe corresponding to the alloy composition. The C peak again is a measurement artefact.

Figure 5:
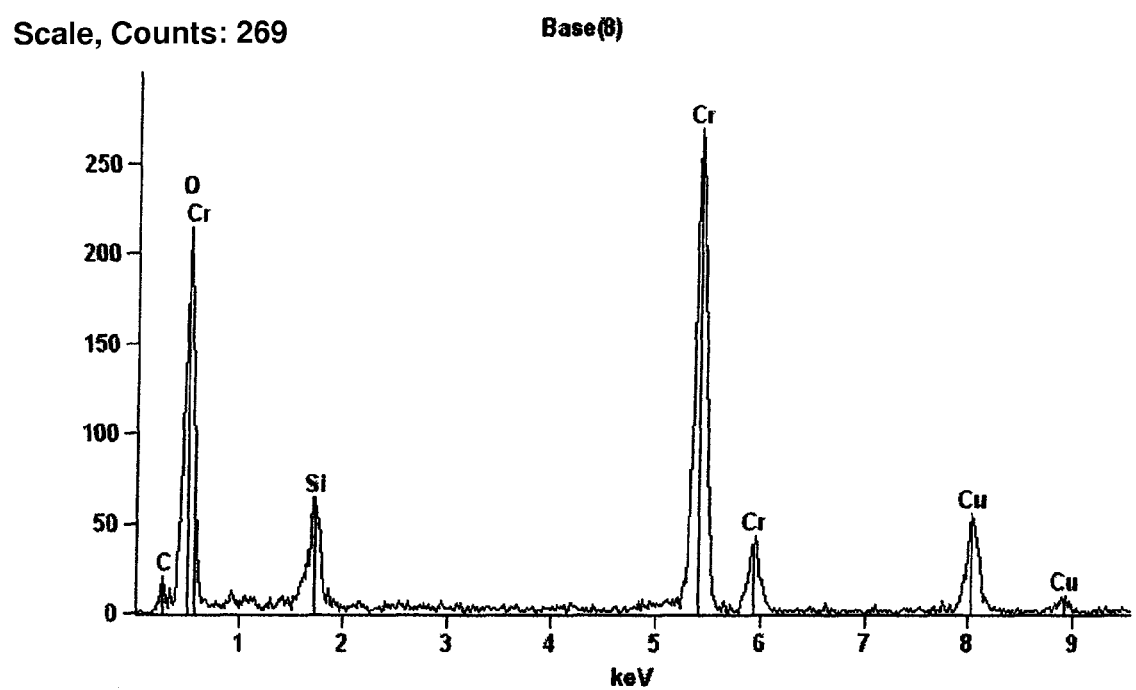
FIG. 5 EDX spectrum for analysis point "Base (8)" as per FIG. 2 (outer oxide layer).

FIG. 5 shows the EDX spectrum of the outer oxide layer. The oxide layer does not contain any Al. Apart from Cr and O, only Si can be detected. The Cr powder used had an Si content of 0.052% by weight.

The Si content does not adversely affect the long-term behavior.

The Cu and C peaks are measurement artefacts.

The interconnectors according to the invention have excellent dimensional stability and an air permeability of $<3\times10^{-4}$ Pa.

The invention claimed is:

1. An interconnector for a high-temperature solid electrolyte fuel cell, comprising:
    a sintered chromium alloy formed with sintering pores, said chromium alloy containing:
        >90% by weight of Cr;
        3-8% by weight of Fe;
        0.1 to 2% by weight of Al; and
    said sintering pores being at least partly filled with an oxidic compound containing Al in an oxidized state and Cr in an oxidized state.

2. The interconnector according to claim 1, wherein said oxidic compound containing Al and Cr has a ratio of Al to Cr, expressed in atom % to atom %, greater than 1.

3. The interconnector according to claim 2, wherein said ratio of Al to Cr, in atom %, of said oxidic compound is greater than 2.

4. The interconnector according to claim 1, wherein said oxidic compound containing Al and Cr is an Al—Cr mixed oxide.

5. The interconnector according to claim 1, wherein said oxidic compound containing Al and Cr is $xAl_2O_3 yCr_2O_3$, where x and y are stoichiometric factors.

6. The interconnector according to claim 1, wherein at least 50% by volume of a total volume of said sintering pores of said chromium alloy is filled with said oxidic compound containing Al and Cr.

7. The interconnector according to claim 1, wherein <0.05% by weight of Al is dissolved in a matrix of said chromium alloy and/or present as an intermetallic phase.

8. The interconnector according to claim 1, wherein said chromium alloy contains from 0.005 to 0.5% by weight of Y.

9. The interconnector according to claim 1, wherein an outer surface is of the interconnector substantially oxide-free.

10. The interconnector according to claim 1, wherein an outer surface of the interconnector is formed with an oxide layer containing at least 90% by weight of chromium oxide.

11. The interconnector according to claim 1, wherein some or all of said sintering pores are at least partially filled with the oxidic compound containing Al and Cr.

12. The interconnector according to claim 1, wherein said sintering pores take up from 2% to 20% of a volume of said sintered chromium alloy.

13. The interconnector according to claim 1, wherein said chromium alloy further contains 0.001-2% by weight of at least one element selected from the group consisting of rare earth metals.

14. An interconnector for a high-temperature solid electrolyte fuel cell, comprising:
    a sintered chromium alloy formed with sintering pores, said chromium alloy containing:
        >90% by weight of Cr;
        3-8% by weight of Fe;
        0.1 to 2% by weight of Al; and wherein one of the following is true:
- all of said sintering pores are at least partly filled with a compound containing Al and Cr, each in oxidized form; or
- at least some of said sintering pores are completely filled with a compound containing Al and Cr, each in oxidized form; or
- at least some of said sintering pores are completely filled with a compound containing Al and Cr, each in oxidized form.

15. The interconnector according to claim 14, wherein said sintering pores take up from 2% to 20% of a volume of said sintered chromium alloy.

16. The interconnector according to claim 14, wherein said chromium alloy further contains 0.001-2% by weight of at least one element selected from the group consisting of rare earth metals.

17. A high-temperature solid electrolyte fuel cell, comprising:
- a ceramic solid electrolyte formed of stabilized zirconium oxide; and
- an interconnector of claim 1.

18. A method of producing an interconnector of claim 1, which comprises the following method steps:
- producing a powder mix from one or more of a mixed powder, a partly pre-alloyed powder, and a fully pre-alloyed powder;
- shaping by die pressing at a pressing pressure p set to 500 p 1000 MPa; optionally presintering at a temperature T set to 700° C. T 1200° C. in a reducing atmosphere and optionally calibration pressing at a pressing pressure p set to 500 p 1000 MPa;
- sintering at a temperature T set to 1200° C. T solidus temperature in a reducing atmosphere;

oxidatively treating;
- for producing an interconnector of claim 1.

19. The method according to claim 18, which comprises setting a temperature T for the oxidative treatment to 700° C.<T<1200° C.

20. The method according to claim 18, which comprises sandblasting the component subsequently to the sintering step.

* * * * *